US005465351A

United States Patent [19]

Lemmo

[11] Patent Number: 5,465,351

[45] Date of Patent: Nov. 7, 1995

[54] CLIENT-SIDE MEMORY MANAGEMENT PROCESS FOR CLIENT-SERVER COMPUTING

[75] Inventor: Steven E. Lemmo, Natick, Mass.

[73] Assignee: Noblenet Inc., Natick, Mass.

[21] Appl. No.: 930,842

[22] Filed: Aug. 14, 1992

[51] Int. Cl.$^6$ .......... G06F 17/30

[52] U.S. Cl. .......... 395/600; 395/200.01; 395/497.04; 395/493; 364/282.4; 364/284.4; 364/974.7; 364/940.62; 364/DIG. 1; 364/DIG. 2

[58] Field of Search .......... 395/600, 800, 395/325, 200

[56] References Cited

U.S. PATENT DOCUMENTS

| | | | |
|---|---|---|---|
| 4,797,810 | 1/1989 | McEntee et al. | 395/425 |
| 4,819,159 | 4/1989 | Shipley et al. | 395/575 |
| 4,928,247 | 5/1990 | Doyle et al. | 364/518 |
| 5,148,527 | 9/1992 | Basso et al. | 395/325 |
| 5,163,131 | 11/1992 | Row et al. | 395/200 |
| 5,218,698 | 6/1993 | Mandl | 345/650 |
| 5,251,322 | 10/1993 | Doyle et al. | 395/800 |

OTHER PUBLICATIONS

Gupta et al., "Reliable Garage Collection in Distributed Object Oriented Systems", *Proceedings COMPSAC 88: The Twelfth International Computer Software and Applications Conference*, 5–7 Oct. pp. 324–328.

*Primary Examiner*—Thomas G. Black
*Assistant Examiner*—Paul R. Lintz
*Attorney, Agent, or Firm*—Iandiorio & Teska

[57] ABSTRACT

A method and system for memory management of a client-server computing network, including passing client arguments packaged as a high level data structure across a network which automatically frees memory allocated for return arguments by chasing pointers until non-pointer data elements are encountered; determining for arguments returned by the network whether any first level data elements are pointers; automatically copying each first level data element that is not a pointer returned by the network to its corresponding memory location within the client argument, and, for first level data elements that are pointers, copying the data structures and data elements defined by the pointers, and zeroing the copied pointers to stop the network from chasing the pointers and to prevent the freeing of data elements and data structures linked to the pointers but not copied for preserving those data elements.

18 Claims, 5 Drawing Sheets

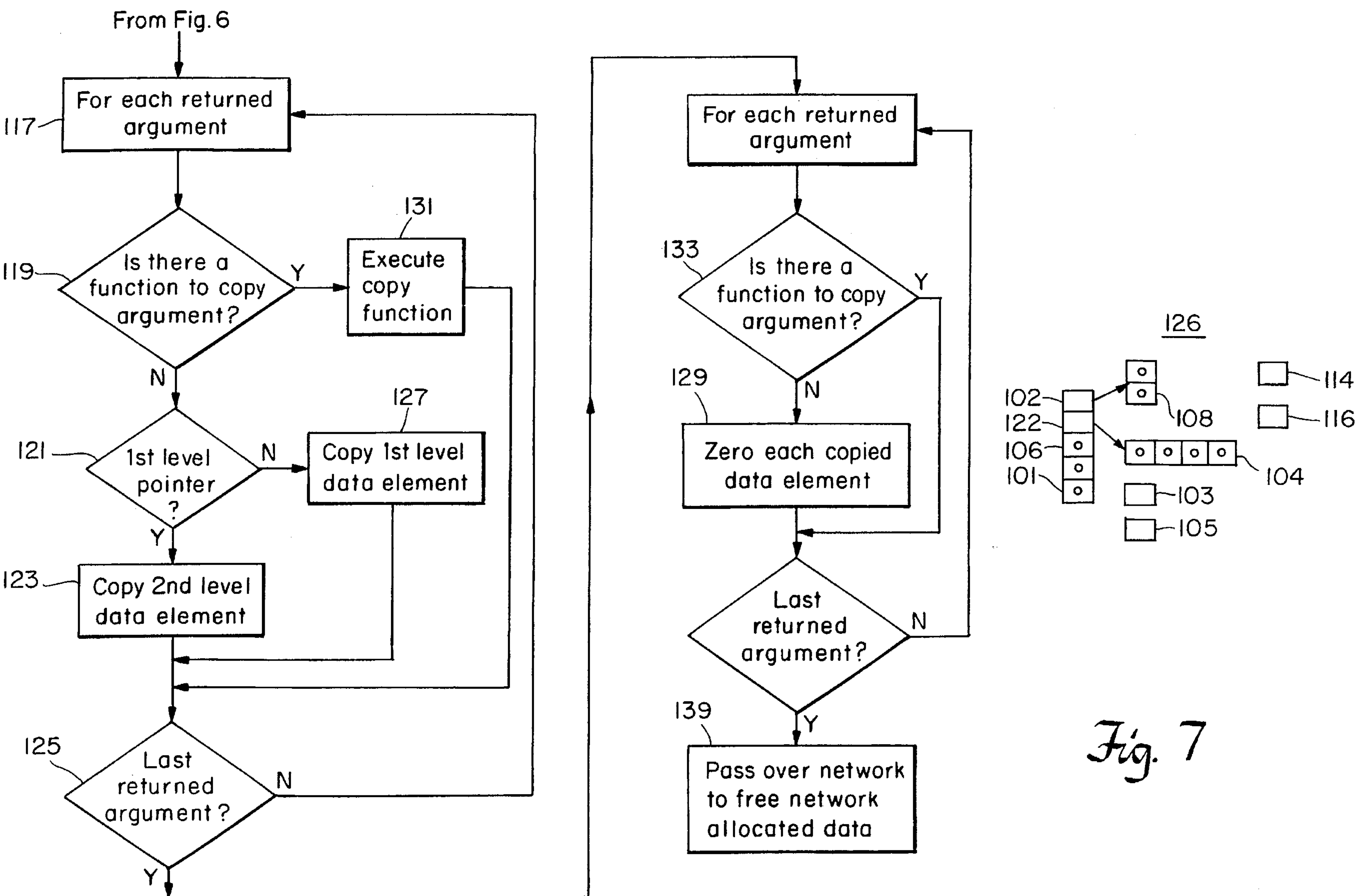
From Fig.6
For each returned argument
117
Is there a function to copy argument?
119
Y
N
Execute copy function
131
1st level pointer ?
121
N
Y
Copy 1st level data element
127
Copy 2nd level data element
123
Last returned argument ?
125
N
Y
For each returned argument
Is there a function to copy argument?
133
Y
N
Zero each copied data element
129
Last returned argument?
N
Y
Pass over network to free network allocated data
139
126
102
122
106
101
108
104
103
105
114
116
Fig. 7

CLIENT-SIDE MEMORY MANAGEMENT PROCESS FOR CLIENT-SERVER COMPUTING

FIELD OF THE INVENTION

A memory management system and method for a computer network client-server data transport mechanism.

BACKGROUND OF INVENTION

Computer networks allow large-scale integration of work stations or even "personal" "mini" or mainframe computers each containing a central processing unit, keyboard, memory, and the like sufficient to operate as stand-alone processors, thereby overcoming the disadvantages of these types of computers as compared to centralized processors coupled with remote but "dumb" terminals. Networks allow resource sharing, which in turn allows users to work more efficiently together. The operator of computer A can use the databases located on the memory of computer B; the operator of computer B can use the printer, or even the central processing unit, of computer A. Furthermore, networks provide improved configuration control over stand-alone systems each subject to reconfiguration by the individual user.

The network itself consists of both hardware and software. The hardware includes the actual communication links such as electrical connections, cables, modem interfaces, buses, and the like between the individual computers; the software includes the programs required to communicate data via the hardware.

The network software is required because memory allocated for information in the address space of one computer in the network may not always match the address space of a second computer. Accordingly, the information to be sent across the network must be "packaged" as a data structure which will have meaning to the receiving computer.

The network software is also required because the communication channels between the computers on the network spread the information out through time while the address space in computer memory spreads the information through space. Accordingly, various error checking schemes must be incorporated to assure that whatever information sent over the network's communication channels is correctly received by the receiving computer.

The following lexicon of network terms has been established by those skilled in the art. Data elements are the internal representation of information stored by computers. A "data element" is a computer representation of numbers, characters, or "pointers." These data elements occupy computer memory that consists of between one and eight bytes of memory. A "pointer" is a special type of data element that is a computer number that contains the beginning memory address of more data elements or data structures. "Data structures" are a collection of data elements or pointers that describe some higher level data object. Data structures that contain pointers have a hierarchical form that may contain multiple levels of subdata structures or elements. An "argument" is a data element or data structure passed to a procedure as input or output. A "procedure," also called a "subroutine" or "function" is a modular piece of a larger computer program. An "RPC call" is a function which makes a procedure call in a remote process as though the procedure was made locally. "RPC Programming" is further defined below.

"Distributed systems" is terminology generally referring to the network software which enables access and transfer of resources on the network automatically. Hence, for example, although one resource truly exists on the memory of computer A, a distributed system allows the operator of computer B to operate computer B as if the resource existed on her computer. Distributed systems are preferred in network applications because the operators of the various personal computers need not be skilled in the networking art. Distributed systems, however, which optimally remain "transparent" to the user and yet allow many different kinds of equipment to participate within the network, present difficult design challenges.

It is known to use subsystems for writing the distributed system software. A subsystem is a set of routines located in a library that provides specific functions on which to build a network application. A platform may consist of "remote procedure call" (RPC) routines and "external data representation" (XDR) routines located in a library.

RPC programming provides an abstraction of making a procedure or subroutine call across a network into a server process. Collections or subsystems of procedure calls are partitioned into a server process in order that they can exist as a network service. This technology is called "client-server computing". The advantage of RPC programming is that if implemented correctly, the network itself is completely invisible to the individual application: if one were to examine the source code of a given application, the source code required by the network would be invisible.

This abstraction is created by conventional RPC compilers to the point where the application can be run, either linked together as a monolith or partitioned into pieces and run distributed in a client-server model. An RPC compiler generates the source code to stub the existing application procedure, package and pass the appropriate procedure argument into a high-level language data structure to be sent to a server process, generate XDR code to encode and decode data to and from the network, unpack arguments and make the real procedure call, and then package and return arguments into the high-level language data structure to be sent back to a client process.

The XDR routine recursively descends through a data structure while encoding and decoding to and from the network. XDR is also used to create data structures that were memory allocated during the decode phase of data transfer.

During the decode phase, however, XDR allocates memory whenever it decodes a pointer from the network. XDR decodes data from the network once on the server side when input arguments are passed to the remote procedure, and once on the client side when the return arguments are passed back to the client application.

One serious disadvantage to this type of network programming however, is "memory leak". Pointers reside in an address space and contain only information denoting the address space of other information. Since a pointer passed across the network would be meaningless to the receiving computer, the client application will pass a pointer to a subroutine and the subroutine will chase pointers through a chain of data elements linked by pointers so that real data is passed. In order to accomplish this task, XDR must allocate memory when it decodes a pointer.

When more than one level of pointer is used, for example, a pointer to a pointer or a pointer to a structure containing other pointers and strings, the possibility exists that the memory space taken up by these structures will never be freed. Therefore, those skilled in the networking art must include routines within their network application to both copy all the relevant data elements back into the client application and free the memory spaces allocated for those data elements. If not freed, memory space will decrease rapidly affecting memory allocation and processing time. In fact, the common complaint that the computer is "acting up" after running many programs over long periods of time is often attributable to memory leakage.

Manual modification of each network application, however, destroys the abstraction that the network is invisible. Moreover, not all programmers and computer users are sufficiently skilled to effectuate such modifications. Unfortunately, since the possible permutations of pointer linked data chains is virtually unlimited, no unified scheme has been developed to effectively copy all the required data and also free memory space no longer needed.

On the other hand, automatic freeing of memory allocated for data elements containing pointers may be accomplished by "chasing" the pointers and then recursively freeing each data element. This scheme, however, is not always desirable since data at the end of a pointer chain may need to be preserved in some cases. Automatically freeing this memory may result in a loss of valuable, needed information.

SUMMARY OF INVENTION

It is therefore an object of this invention to provide a client side memory management system and method for client-server computing associated with a network data transfer system.

It is a further object of this invention to provide such a client side memory management system and method for client-server computing associated with network data transfer systems which prevents memory leak, but also preserves needed information located at the end of a pointer chain of data elements.

It is a further object of this invention to provide such a client side memory management system and method for client-server computing associated with a network data transfer system which frees XDR allocated-memory without violating the abstraction that the network software is completely invisible to the application.

It is a further object of this invention to provide such a client side memory management system and method for client-server computing associated with a network data transfer system in which all routines necessary to manage memory and copy out data are all within the RPC layer of the abstraction and hence invisible to the calling application.

It is a further object of this invention to provide such a client side memory management system and procedure for client-server computing associated with a network data transfer system which allows the application to be linked as a monolith for debugging or non-distributed execution.

It is a further object of this invention to provide such a client side memory management system and method for client-server computing associated with a network data transfer system which is easier to implement.

This invention results from the realization that a network system frees memory by chasing pointers until data elements that are not pointers are encountered and that an effective memory management system can be accomplished by automatically copying all information up to the second level of pointer linked data structures if all pointers so copied are zeroed thus preventing the network from freeing data not copied to preserve that data; and the further realization that if the network is modified for a particular application to copy specific pointer linked data elements or data structures, the memory management system can be made to recognize the modification and not zero pointers in that chain of linked data so the network will automatically free memory and prevent memory leak.

This invention features a method of managing memory in a client-server computing network including a memory management process in which client arguments packaged as a high-level data structure is passed across the network which automatically frees memory allocated for return arguments by chasing pointers until data elements that are not pointers are encountered, determining for arguments returned by the network whether any first level data elements are pointers, automatically copying each first level data element that is not a pointer returned by the network to its corresponding memory location within the client argument, and, for first level data elements that are pointers, copying the data structures and data elements defined by the pointers. Finally, each pointer so copied is zeroed to stop the network from chasing the pointers and preventing the freeing of data elements and data structures linked to the pointers but not copied for preserving those data elements. Should a network copy function reside within the network, this invention also recognizes the network resident copy function and suspends automatic copying and zeroing of any data elements traceable from data elements to be copied by the network resident copy function and then automatically executes the network resident copy function. Finally, the returned data struture containing zeroed pointers is passed over the network to free the memory associated with data elements copied to the client argument.

Server return arguments passed across the network may have one or more levels of data elements such as a number, a character, or a pointer, or data structures including data elements to be copied into a corresponding client application. It is determined whether first level data elements are pointers and resolved whether data elements traceable to the first level pointers are designated for copying by an extraneous function. If they are not, each first level data element that is not a pointer is automatically copied to its corresponding memory location within the client application and each second level data element not linked to data elements designated for copying are also copied to their corresponding memory location within the client application. The copied pointers are then automatically zeroed to stop the network from chasing those pointers and freeing data elements not designated for copying by the function. For arguments designated for copying by an extraneous copy function, the function may be executed to copy all data elements so designated and then all data elements copied by the extraneous function as well as the data elements traceable from the copied data elements are freed. A server procedure which performs a task contingent on arguments received from a client application may be defined, executed, and then server procedure return data elements are passed across the network to be copied into a corresponding client application. A determination is made for each first level individual data element of the return argument whether a pointer exists, and if not, the first level data element is automatically copied to its corresponding memory location within the client application. If the first level data element is not a pointer, the second level data element defined by the first level pointer is automatically copied to its corresponding memory location within the client application. All pointers are then zeroed to prevent the network data transfer system from chasing the pointers and freeing data elements not copied. Alternatively, all data elements copied may be zeroed for convenience.

This invention also features a memory management system for a client-server computing network which automatically frees memory allocated for return arguments by chasing pointers until non-pointer data elements are encountered. There are means for determining, for arguments returned by the network, whether any first level data elements are pointers, and means for automatically copying each first level non-pointer data element returned by the network to its corresponding memory location within a client argument, and, for first level pointers, for copying the data structures and data elements defined by the pointers. There are also means for zeroing all copied pointers to stop the network from chasing those pointers and to prevent the freeing of data elements linked to those pointers but not copied for preserving those data elements. There may also be means to recognize a network resident copy function, means to suspend the means for automatically copying and the means for automatically zeroing, for data elements traceable from data elements to be copied by the copy function, as well as means to execute the resident network copy function. Also featured are means for passing one or more server return arguments having one or more levels of data elements each containing at least one of a number, a character, or a pointer across the network data transport mechanism to be copied into a corresponding client application, and means for determining for each return argument whether individual first level data elements are pointers. Resolving means establish whether data elements traceable to first level pointers are designated for copying by an extraneous function, and if so, means for executing any extraneous function to copy all data elements so designated. For data elements not so designated, there are means for automatically copying each non-pointer first level data element to its corresponding memory location within the client application and for automatically copying second level data elements not linked to data elements designated for copying. There are means for zeroing the pointers automatically copied to stop the network from chasing those pointers, and means for freeing the data elements copied by the extraneous function and freeing data elements traceable from the data elements copied by the extraneous function.

This invention also features a memory management system for use in a client-server network in which memory is allocated whenever a data structure containing one or more levels of pointers is passed from a server process to a client application during decoding of the data structure and such allocated memory is automatically freed by chasing non-nil pointers through the level of pointers comprising means for determining for each first level individual data element being passed to said client application whether a pointer exists, means for automatically copying each non-pointer first level data element to its corresponding memory location within the client application, means for automatically copying the second level data element defined by a first level pointer to its corresponding memory location within the client application, and means for automatically zeroing any data element copied to nullify all the pointers and stop the system from chasing the pointers and to prevent the client-server network from freeing data elements linked to the pointers but not copied for preserving those data elements. The system may further include means for recognizing a network resident copy function, means for suspending the automatic copying and zeroing means for any data element traceable from data elements to be copied by the network resident copy function, and means for automatically executing the network resident copy function.

Finally, this invention features a memory management system including a client-side function including means for passing server arguments across the network to be copied into a client application, means for establishing which arguments are to be copied by a network resident copy function, and which arguments are to be copied automatically, means for executing the client-side function for the arguments to be copied automatically including means for copying each data element and data structure defined by an argument that is a pointer, means for automatically copying an argument that is not a pointer to the client application, and means for automatically zeroing the copied pointers to stop the network from chasing those pointers. For the arguments to be copied by the network copy function, there are means for suspending the client-side function, including means for invoking the network resident copy function instead of the client-side function.

DISCLOSURE OF PREFERRED EMBODIMENT

Other objects, features and advantages will occur to those skilled in the art from the following description of a preferred embodiment and the accompanying drawings, in which:

FIGS. 6–7 are block diagrams of the general client-side memory management process for client-server computing according to this invention.

Figure 1:
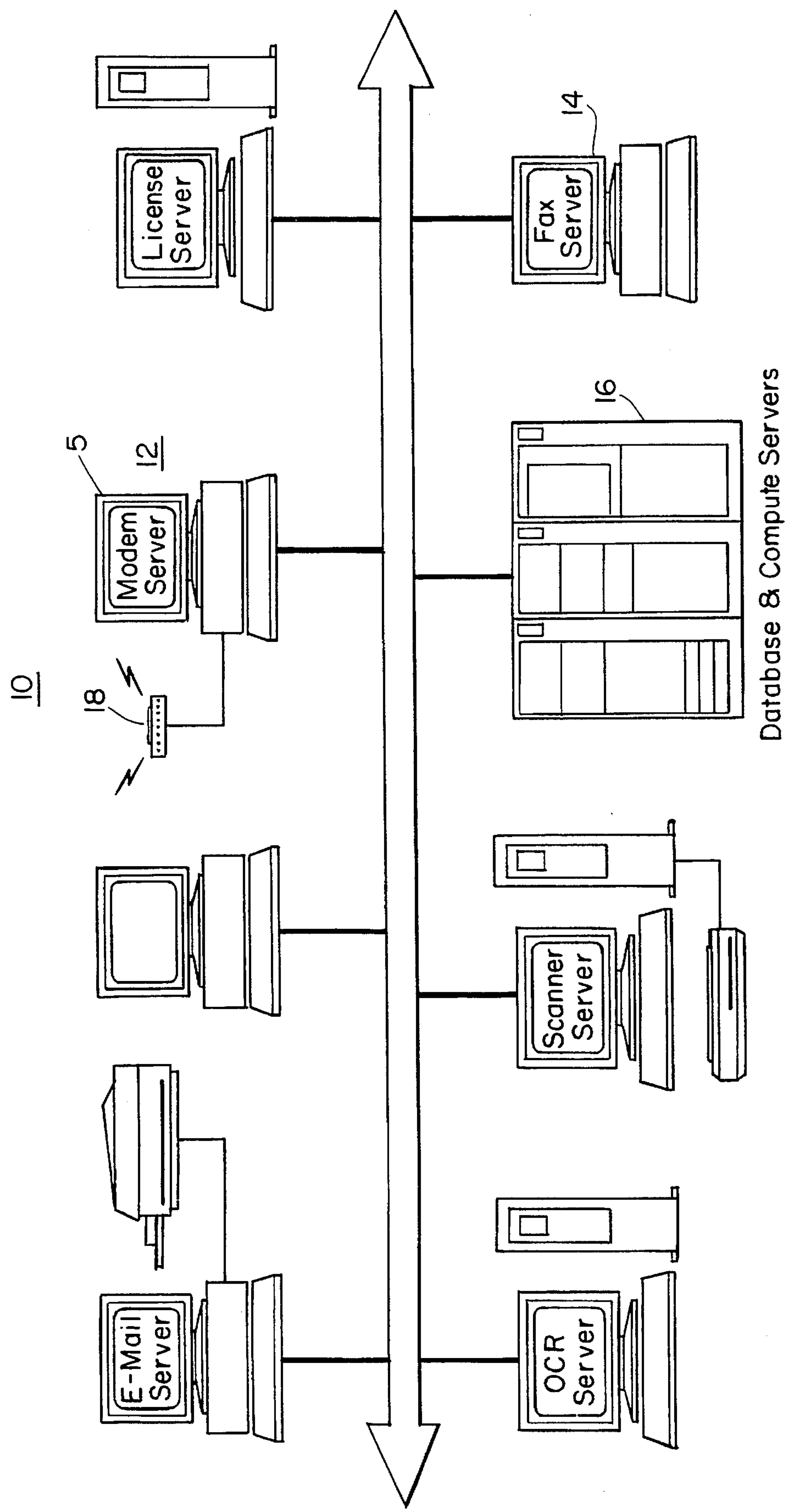
FIG. 1 is a conceptualized view of a client-server network employing this invention.

Client-server network 10, FIG. 1, includes stand-alone personal computers 12 and 14 and mainframe or minicomputer 16, which may include a large integrated database or an application program. A network data system implemented by those skilled in the computer networking art allows the operator of computer 14 to utilize modem 18 attached to computer 12. The operator of computer 12, in turn, may utilize the database located on computer 16.

An example of a client's application program is a program which displays "Hello World" on, for example, the computer screen 5 of computer 12, FIG. 1. This program, called Hello.C, written in the "C" high-level programming language, may appear thus:

```
void main   ()
{
    prt("Hello", "World/n");
}
void prt(text1, text2)
char *text1;
char *text2;
{
    printf("%s %s",text1, text2);
}
```

Executed on computer 12, Hello.C will display "Hello

Figure 2:
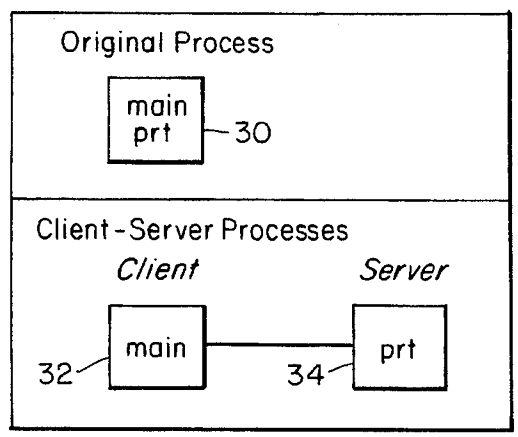
FIGS. 2 is a block diagram of an original process broken down into client and server processes for client-server computing.
Figure 3:
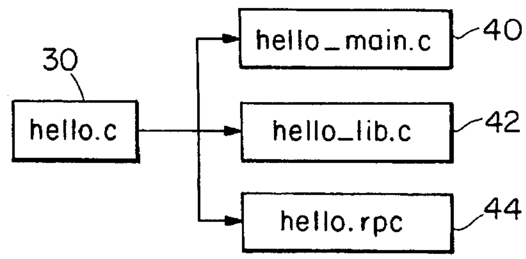
FIG. 3 is a block diagram of a particular application and the programs required for such computing.

World" on computer screen 5. To convert such a program to a distributed application, however, requires that the original application 30, FIG. 2, be divided into two independent processes: a client process 32 and a server process 34. The relationship between the client and server is fairly straightforward. The client tells the server to do something (in the form of a function call), possibly sending data in the form of function arguments along with the request. The server then executes the function. Optionally, the server can return data back to the client. This cycle of sending requests and data from the client to the server and back can go on as long as required for a specific application. By convention, RPC programming requires the creation of the files Hello_main.C 40, FIG. 3, Hello_lib.C 42, and Hello.rpc, 44. Hello_main.C program 40 is the client program, and may be defined as follows:

```
main(argc,argv)
intargc;
char **argv
{
      hello_open_transport(argv[1],0,0);
      prt("hello", "World ");
}
```

Hello_lib.C program 42 is a server program which may be defined as follows:

```
prt(text1, text2)
char *text1;
char *text2;
{
      printf("%s %s",text1, text2);
}
```

Hello.RPC file 44 may be a file the user creates. It contains information that the RPC compiler needs to generate functions that allow that file Hello_main.C 40, and Hello_lib.C 42 to execute separately in a client-server environment. The Hello. RPC file may appear thus:

```
program HELLO {
   version HELLO_ORIG {
          int prt( [in] string8 *txt1,
                        [in] string8 *txt2 )   {}=1;
   }=1;
}=99;
```

Figure 4:
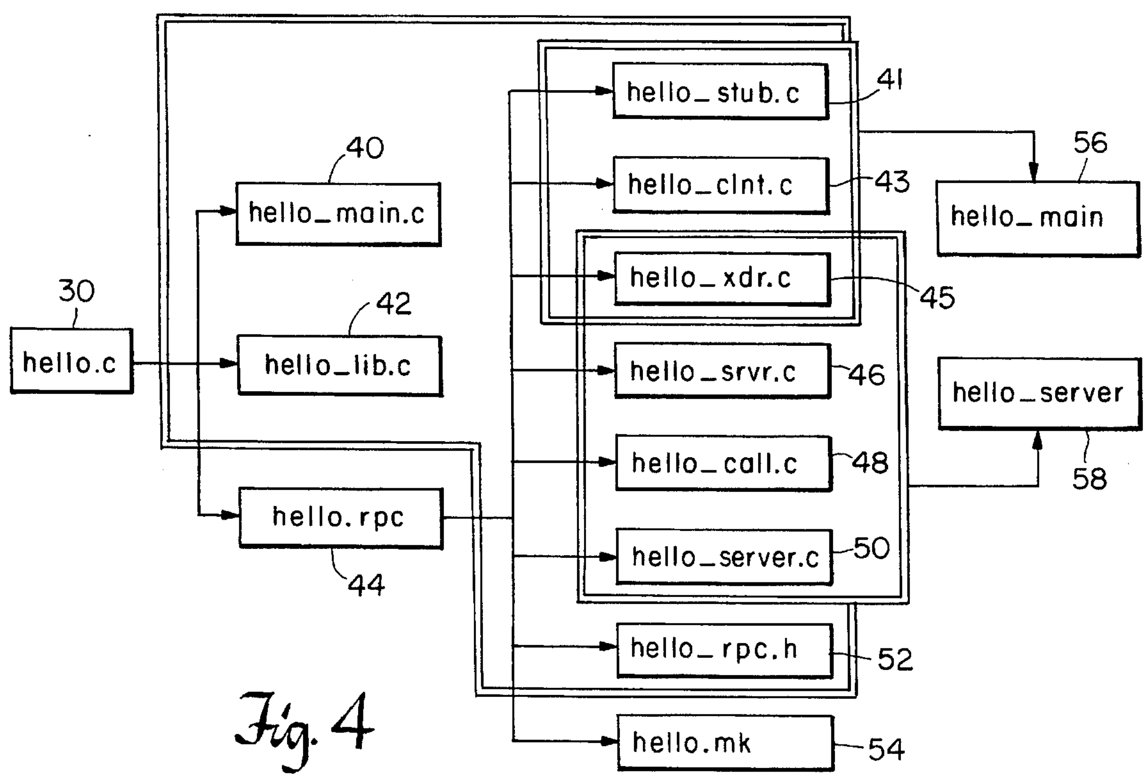
FIG. 4 is a block diagram of further routines required for such computing.

After the RPC compiler processes this data, it generates C language files that transform the original program into a client-server application. These files are illustrated in FIG. 4, wherein Hello_stub.C 41, Hello_clnt.C 43, Hello_xdr.C 45, Hello_srvr.c, 46, Hello_call.C, 48, Hello_server.C 50, Hello_rpc.h 52, and Hello.mk 54, are generated. This "platform" in turn creates the client procedure 56 and the server procedure 58. The actual format of the generated files will be understood by those skilled in the art and can be found in the user's manual for "EZ-RPC, Easy RPC Programming for Client-Server Computing" available from NobleNet, Inc., Natick, Mass., or, "The Art of Distributed Applications: Programming Techniques for Remote Procedure Calls" and "The Network Programming Guide" available from Sun® Microsystems, Inc., Mountain View, Calif. 94043.

The executable program, Hello_main 56, FIG. 4, the client program, may be executed on computer 12, FIG. 1, and Hello_server 58, FIG. 4, which actually resides on computer 14, FIG. 1, would print "Hello World" on computer screen 5 of computer 12.

Figure 5:
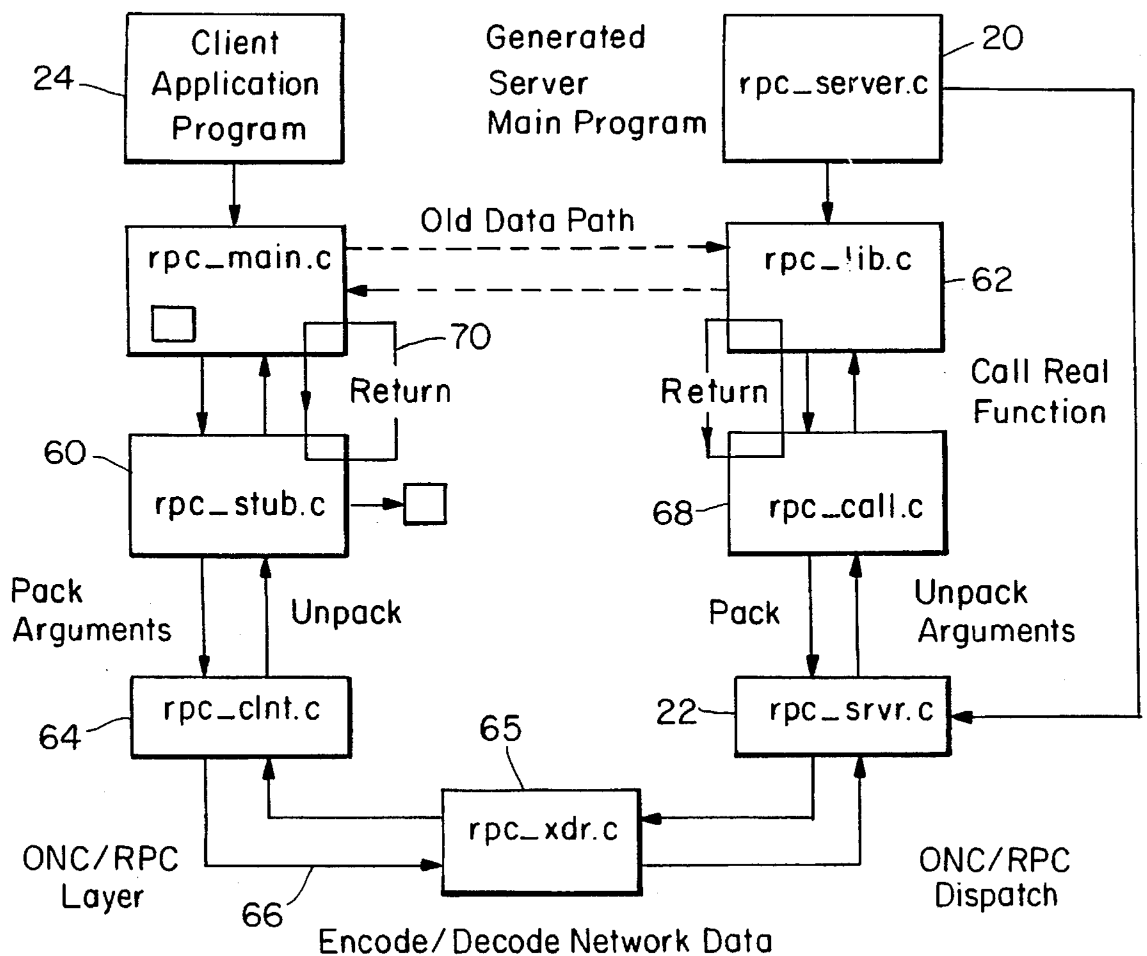
FIG. 5 is a block diagram of the transport mechanism in a network data system for RPC programming according to this invention.

This client-server processing is accomplished by the transport mechanism represented in FIG. 5, in which server process or procedure 20, FIG. 5, is executed on network 10, FIG. 1. Server process or procedure 20, FIG. 5, is the generated main program where the server process initializes and then transfers control to the generated RPC dispatcher 22 where the server process waits for incoming RPC calls.

The client's application program 24, at some time may make a call to a procedure that happens to be an RPC procedure.

Accordingly, in general terms, the server process is executed on the network wherein rpc_server.C 20, FIG. 5, is the generated main program where the server process initializes and then transfers control to the generated RPC dispatcher, rpc_server.C 22, and the server process waits for incoming RPC calls. The user's application program 24, at some time makes a call to a procedure that happens to be an RPC procedure. The application transfers control to a generated RPC stub procedure 60, FIG. 5, thinking it is calling its procedure residing in rpc_lib.C 62. The stub procedure packages all arguments designated as "input" into an in/out high-level data structure for the network data transfer system 23, and then transfers control down to client communications layer contained in rpc_clnt.C 64. The client communication initiates sending the input high level data structure to the server process. This action transfers control to the network data transfer system.

The client side network data transfer system recursively descends through the input higher level data structure encoding elements on the network. During the encode phase represented at 66, the system recursively descends through data structures breaking down data into its data elements and encoding each element onto the network in a neutral format. Whenever the system encounters a pointer, it first encodes a Boolean number onto the network, to notify the decoding process as to whether the pointer was nil. If the pointer was non-nil, the encoding system moves to the address of the data element pointed to by the pointer and starts encoding from there. It then returns control back to the client communication layer, where it waits for the return response. The server process 22 then determines which RPC request is being made and transfers control to the network data transfer system to read the input higher level data structure being sent from the client. The server side network data transfer system recursively descends through the input higher level data structure decoding its elements from the network.

The decode phase of the network data transfer system recursively descends through data structures, breaking down data into its data elements and decoding each element from the network neutral format to the element format for the machine on which it is running. Whenever the system encounters a pointer, it first decodes the Boolean notification of whether the pointer is nil. If the pointer was non-nil, the decoding system allows memory to decode the data structure pointed to by the pointer. It then moves to the address of the allocated memory, and starts decoding data elements into that memory space. It is during this phase where server-side memory is allocated if any pointer element exists in the input high level data structure. After the data is decoded from the network, control is transferred back to the dispatcher process, rpc_srvr.c 22. The server side dispatcher now passes control to the procedure calling layer 68. The server side calling layer unpackages the input high level data structure containing the argument sent from the client, and makes the real procedure call to the applications procedure contained in rpc_lib.C 62. Upon return from the application procedure, all of the arguments that were designated as return arguments are packaged into the output high-level data structure for sending back to the client process. Then the calling layer returns to the RPC dispatcher layer rpc_srvr.c 22. Dispatcher layer initiates sending the return values contained in the output high-level data structure and passes control to the network data transfer system.

The server side network data transfer system recursively descends through the output higher level data structure encoding elements onto the networks, similar to the encode phase discussed above. Control is then returned back to the RPC dispatcher 22. The RPC dispatcher now calls back to the network data transfer system to free all memory allocated during the decode phase of the input high-level data structure. The network data transfer system recursively descends through the input high-level data structure, freeing all memory that was allocated during the decode phase of data transfer. This memory is freed on the return descent from pointer elements. This free phase of the network data transfer system recursively descends through data structures, freeing memory that was allocated during the decode phase of the data transfer. The memory is freed on the return descend from chasing a non-nil pointer. The client-side network data transfer system recursively descends through the output high-level data structure decoding its elements from the network, similar to the decode phase described above. It is here where client-side memory is allocated if any pointer element exists in the output high-level data structure. After the data is decoded from the network, control is transferred back to the client communication procedure 64. The client-side communication procedure returns control back to the RPC stub layer 60, which now must memory copy all of the returned arguments from the output high-level data structure back into the real arguments passed into the stub procedure by the calling application. It is during this process, shown at 70, that the potential for memory leak can occur.

In summary fashion, then, memory is allocated by transport mechanism 23, FIG. 5, wherever a non-nil pointer exists in a data element during the decode phase on the client side. This allocated memory may be freed by chasing non-nil pointers until a data element is reached which is not a pointer. The system may free that data element and then backtrack to free all data elements previously encountered by chasing non-nil pointers. This scheme of allocating and then subsequently freeing memory is the genesis for the instant invention, but one other point must be made: pointers are nullified by replacing them with zero's. This invention builds on this knowledge; the result being a system and method for halting the freeing of memory in some cases where information must be preserved but also allowing the automatic freeing of memory in other cases where extraneous RPC level programming is provided to properly copy all the desired information.

Figure 6:
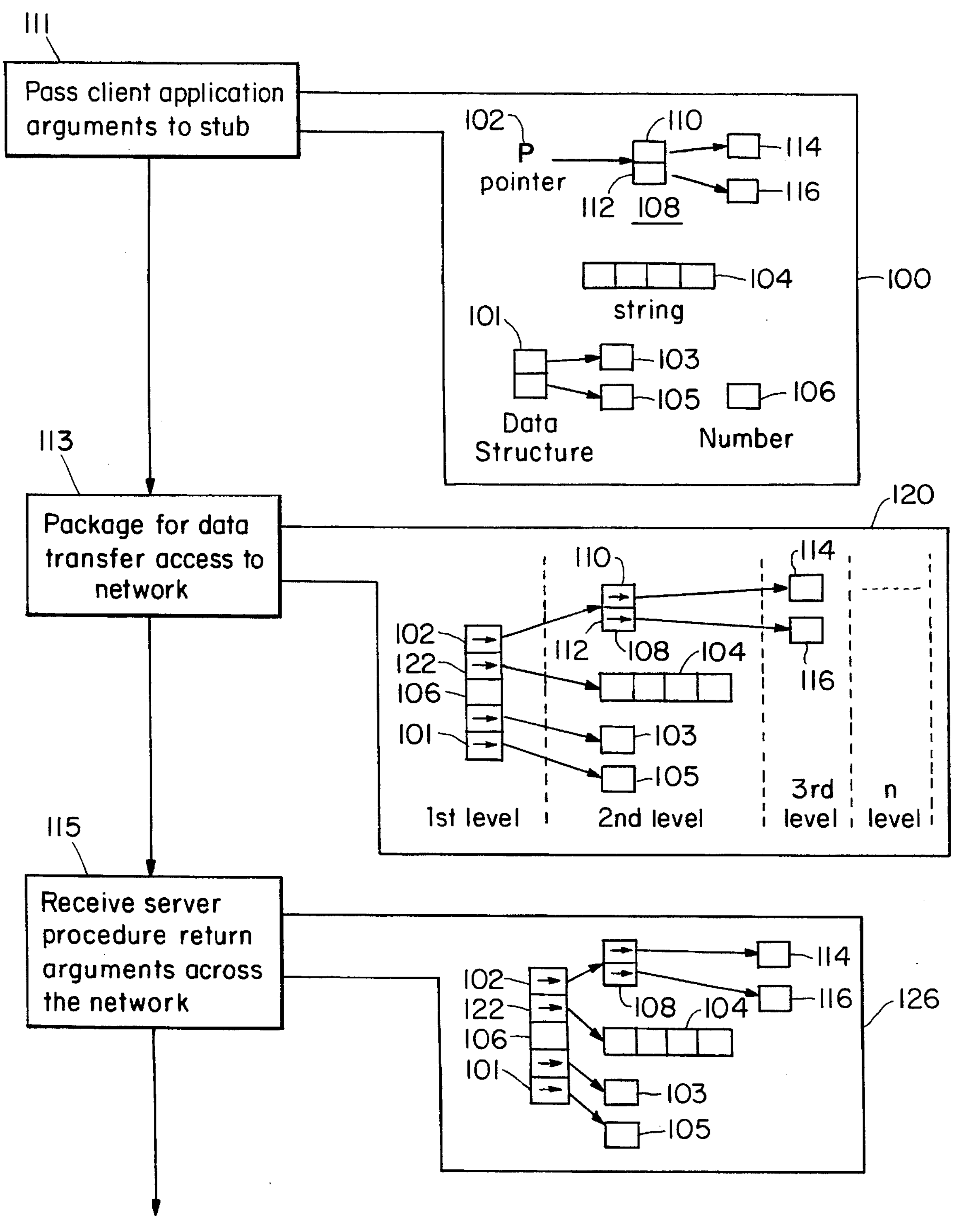

The process begins when client application argument 100, FIG. 6, is passed to the stub layer 60, FIG. 5, step 111, FIG. 6, and packaged, step 113. Client application argument 100 comprises in this example data elements consisting of a pointer 102, a string 104, data structure 101 including two pointers which denote data elements 103 and 105, respectively, and a number 106 for arguments of an application such as APP(p, string, s, number) although of course numerous other permutations are possible. Also, note pointer 102 denotes the beginning of a chain of pointers and hence denotes the address spaced for data structure 108 itself made up of individual data elements 110 and 112 each pointing to non-pointer data elements 114 and 116 which may be numbers or characters.

As discussed above, RPC_stub.C 60, FIG. 5, will package these individual data elements as high level data structure 120, step 113, FIG. 6. In this example, there are three levels, the first level consisting of pointer 102, pointer 122 denoting the address space for string 104, data structure 101, and number 106. The second level consists of data structure 108, data elements 103 and 105, and string 104. The third level consist of data elements 114 and 116 in this example.

Returning to FIG. 5, high level data structure 120, FIG. 6 is passed through the client-server transport mechanism 23 to RPC_server.C, the server program, which executes and then passes server procedure return argument 126, FIG. 6, back across the client-server transport mechanism 23, FIG. 5. This process is denoted as step 115, FIG. 6.

According to one embodiment of this invention, an evaluation is performed for each returned argument, step 117, to resolve whether a function has been added to RPC_stub.C 60, FIG. 5, to copy a particular argument, step 119, FIG. 6. If not, the memory management system evaluates the high level data structure 126.

It is known that after copying the relevant information back into the client application, client-server transport mechanism 23, FIG. 5 would free the memory spaces allocated for high level data structure 126, FIG. 7, by chasing pointer 102 to data structure 108 and then encountering pointers 110 and 112 to arrive finally at data elements 114 and 116. Data element 114 would be freed, and then the transport mechanism 23, FIG. 5, would backtrack to free pointer 110, FIG. 6. Pointer 108 would then be followed to encounter data element 116 which would then be freed and the mechanism would backtrack to free data element 108. Note that any information contained in the third level memory space allocated for data elements 114 and 116 would be lost.

To prevent this loss of information from occurring, in cases where no other programming is encountered which would copy these data elements and copying is performed automatically, the system of this invention determines whether a first level pointer exists in the return high level data structure, step 121 and if so, the system copies the second level data, step 123, namely what that pointer denotes. If no pointer is encountered, in other words if a character, number, or data structure exists in the first level of data structure 126, that number, character, or data structure is automatically copied, step 127. This continues until all arguments have been so evaluated, step 125. Since data elements 114 and 116 in the third level of data structure 126 and data elements 103 and 105 in the second level are not copied into the client's application, the information contained in those data elements must be preserved. Since transport mechanism 23, FIG. 5, would automatically free the memory allocated for these data elements 114 and 116, FIG. 6, by chasing pointers as discussed above, the system of this invention zeros all pointers copied, step 129, FIG. 7, to nullify the pointers previously contained in data structure 126 and thereby prevent the automatic freeing of the memory allocated for data elements 114 and 116 and also 103 and 105. Chasing of pointers is prohibited now because the chain of pointers is broken.

A similar process is repeated to copy string 104 and data structure 101 until no more first level pointers are encountered in which case any non-pointer data elements of the first level are copied, step 127, FIG. 6.

In this way, the memory locations and hence the information contained in data elements not copied are preserved while allowing automatic copying of the required data element or data structures in levels one and two of a high level data element returned by the server procedure. This invention, then, allows the freeing of some memory automatically and yet preserves the information still needed while at the same time allowing automatic copying up to certain levels of pointer chains. For high level data structures only containing two levels of pointers, this invention automatically and properly copies all the required information and allows the memory allocated by the XDR routine to be freed. Prior art systems require programmers skilled in the network art to manually invoke programs to perform both the copy and the memory freeing functions of this invention. This destroyed the desirable abstraction that the network is invisible to the ultimate user.

In another feature of this invention, a system allows a function to be added to the RPC_stub.C 60 layer, FIG. 5 of transport mechanism 23 which copies third and higher level data elements or structures such as data elements 134 and 138, FIG. 6. If such a function is introduced, the system of this invention recognizes the copy function, step 119, FIG. 6, and step 133, FIG. 7, and allows the automatic freeing of memory by executing the copy function, step 131, FIG. 6, and bypassing the copy and zeroing steps for these return data elements so designated. Finally, the returned data structure 126 is passed over the network, step 139.

In this way, extraneous programming can be introduced into the RPC layer of the abstraction and the network remains invisible to the user.

In summary, without the introduction of a specific function to copy a particular data in a chain of pointers, this invention automatically copies all first level data elements that are not pointers and all second level data elements or structures denoted by a first level pointer. Since there may be data elements which must then be preserved, automatic freeing of these elements is halted by zeroing each pointer copied. This nullifies the pointers and stops XDR from chasing pointers and freeing memory spaces for data elements and data structures not copied.

Should, however, extraneous programming such as a copy function be introduced into the RPC layer of the data transport mechanism, the system of this invention also executes that copy function and allows XDR to free all the memory in any chains of pointer related data so copied since such data will now not be lost. From the flow charts of FIGS. 6 and 7, the XDR and RPC program, previously described, and the discussion herein, those skilled in the networking art will be able to program network data transfer mechanism 23, FIG. 5, to accomplish the embodiments of this invention.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A method of managing memory in a client-server computing network including a memory management process, the method comprising:

passing client arguments packaged as a high level data structure across a network which automatically frees memory allocated for return arguments from the client side of the network by chasing pointers until non-pointer data elements are encountered, the freeing of memory occurring on the client side of the network;

determining for each argument returned by the network whether any first level data element is a pointer;

automatically copying, for each argument that includes a first level data element that is a pointer, any data structures and data elements defined by said pointers to a client application high level data structure, and automatically copying, for all said arguments not having a first level data element that is a pointer, any first level data elements and data structures from the returned high level data structure to a client application high level data structure; and zeroing the copied data elements that are pointers to stop the network from chasing said pointers and to prevent the freeing of data elements linked to said pointers but not copied for preserving said data elements.

2. The method of claim 1 further including;

recognizing a network resident copy function;

suspending, in response to recognition of said network resident copy function, said automatic copying and zeroing by said memory management process of any data elements and data structures of an argument to be copied by said network resident copy function; and automatically executing said network resident copy function.

3. A client-server memory management method for a network data transfer transport mechanism comprising:

passing one or more server return arguments packaged as one or more levels of data elements across the network data transport mechanism to be copied into a corresponding client application;

determining for each said return argument whether a pointer is present as a first level data element;

resolving whether data elements traceable to said pointer are designated for copying by an extraneous function;

automatically copying, for each said return argument, each first level data element and data structure that is not a pointer to its corresponding memory location within said client application, and automatically copying any second level data elements and data structures not linked to said data elements designated for copying; said copying being from the returned high level data structure to application high level data structure, zeroing any pointers automatically copied to stop the network from chasing said pointers and freeing data elements not designated for copying by said function;

executing any said extraneous function to copy all data elements designated by said extraneous function; and freeing the data elements copied by said extraneous function and freeing the data elements traceable from said data elements copied by said extraneous function.

4. A method of managing memory in a client-server computing network comprising:

packaging one or more client application arguments into a high level data structure;

passing said high level data structure across the network to a server procedure;

passing a server procedure return high level data structure across the network to the client application making the request;

for each argument of said return high level data structure, recognizing whether a copy function resides in the client-side of the network to copy the argument, and executing said copy function to copy remotely returned arguments so designated into said client application;

for each argument of said return high level data structure not designated for copying by said network resident copy function, determining whether the first level of said argument is a pointer, automatically copying any first level data elements or data structures that are not pointers from the returned high level data structure into said client application, automatically copying any second level data elements and data structures denoted by first level pointers and automatically zeroing copied pointers, from the returned high level data structure into said clients application, including any pointers of a copied data structure to stop the network from chasing said pointers and to preserve any data elements and data structures not copied.

5. In a client-server network system in which client memory is allocated whenever a data structure containing one or more levels of pointers is passed from a server process to a client application during decoding of the data structure, and such allocated memory is automatically freed by chasing non-nil pointers through the levels of pointers; a method for managing memory for arguments passed over the network, comprising:

determining for each first level individual data element of each argument being passed to said client application whether a pointer exists;

automatically copying each first level data element that is not a pointer to its corresponding memory location within said client application;

automatically copying each second level data element and data structure defined by a first level pointer to its corresponding memory location within said client application; and automatically zeroing any pointer copied to nullify each said pointer and stop the system from chasing said pointers and to prevent the freeing of data elements linked to said pointers but not copied for preserving said data elements.

6. The method of claim 5 further including:

recognizing a network resident copy function; suspending, in response to recognition of said network resident copy function, said automatic copying and zeroing of any data elements and data structures traceable from data elements to be copied by said network resident copy function; and automatically executing said network resident copy function.

7. A client-side memory management method for client-server computing associated with a network data transfer system comprising:

passing server data elements linked by pointers across the network to be copied into the client application;

establishing which said server data elements are to be copied by a network copy function and which said server data elements are to be copied automatically;

for said server data elements to be copied automatically, executing a memory management process including determining whether any first level data elements are pointers, automatically copying from the returned high level data structure to application high level data structure all first level data that is not a pointer to the client application, automatically copying all data elements and data structures defined by first level pointers, and zeroing all copied pointers to stop the network from chasing said pointers; and for said server data elements to be copied by said network copy function, suspending said memory management process and executing said copy function.

8. A client-side memory management method for client-server computing associated with a network data transfer system, comprising:

passing of data from client to server;

defining a server procedure which performs a task contingent on arguments received from a client application;

executing said server procedure;

passing server procedure return data structures and data elements including at least one of a number, character, and a pointer across the network to be copied into a corresponding client application;

determining, for each first level individual data element of said return argument, whether a pointer exists;

automatically copying each first level data element and data structure that is not a pointer to its corresponding memory location within said client application;

automatically copying each second level data element and data structure defined by a first level pointer to its corresponding memory location within said client application; and zeroing each pointer copied to prevent the network data transfer system from chasing said pointers and freeing data elements not copied.

9. The method for managing memory of claim 8 further including;

resolving whether any data elements and data structures are designated for copying by a copying function; and stopping said automatic copying and zeroing for all pointers linked to data elements so designated to facilitate the freeing of all memory allocated for said data elements so designated once said data elements are copied from returned high level data structures to another high level data structure, by said copy function.

10. The method for managing memory of claim 9 further including invoking said copy function to copy all data elements so designated.

11. A memory management system for a client-server computing network which automatically frees memory allocated for return arguments by chasing pointers until data elements not containing pointers are encountered, comprising:

means for determining, for each argument on the client side returned by the network from the server, whether any first level data elements are pointers;

means for automatically copying from the network into the client application, for each argument, each first level data element and data structure that is not a pointer returned by the network to its corresponding memory location within said client argument, and, for first level data elements that are pointers, for copying the data structures and data elements defined by said pointers; and means for zeroing the copied pointers to stop the network from chasing said pointers and to prevent the freeing of data elements linked to said pointers but not copied for preserving said data elements so that the client application can access said pointers.

12. The system of claim 10 further including:

means to recognize a network resident copy function;

means to suspend said means for automatically copying and said means for automatically zeroing for any data elements and data structures traceable from data elements and data structures to be copied by said copy function; and means to execute said network resident copy function.

13. A client-server memory management system for a network data transfer transport mechanism comprising:

means for passing one or more server return arguments having one or more levels of data elements and data structures across the network data transport mechanism to be copied into a corresponding client application;

means for determining for said return argument whether individual first level data elements are pointers;

means for resolving whether data elements and data structures traceable to said first level pointers are designated for copying by an extraneous function;

means for automatically copying, from the returned high level data structure to another high level data structure, each first level data element and data structure that is not a pointer to its corresponding memory location within said client application and automatically copying second level data elements and data structures not linked to data elements designated for copying and not linked to first level data structures copied;

means for zeroing the pointers automatically copied to stop the network from chasing said pointers;

means for executing any said extraneous function to copy all data elements designated by said extraneous function; and means for freeing the data elements and data structures copied by said extraneous function and freeing the data elements and data structures traceable from said data elements and data structures copied by said extraneous function.

14. In a client-server network in which memory is allocated whenever a data structure containing one or more levels of pointers is passed from a server process to a client application during decoding of the data structure, and such allocated memory is automatically freed by chasing non-nil pointers through the levels of pointers; a memory management system comprising;

means for determining for each first level individual data element being passed to said client application whether a pointer exists;

means for automatically copying, from the returned high level data structure to another high level data structure, each first level data element that is not a pointer to its corresponding memory location within said client application;

means for automatically copying each second level data element defined by a first level pointer to its corresponding memory location within said client application; and means for automatically zeroing any pointers copied to nullify each said pointer and stop the system from chasing said pointers and to prevent the freeing of data elements linked to said pointers but not copied for preserving said data elements.

15. The system of claim 14 further including:

means for recognizing a network resident copy function;

means for suspending, in response to said recognition means, said automatic copying means and said zeroing means for any data elements and data structures traceable from data elements to be copied by said network resident copy function; and means for automatically executing said network resident copy function.

16. A client-side memory management system for client-server computing associated with a network data transfer mechanism comprising:

means for passing server data elements linked by pointers across the network to be copied into a client application;

means for establishing which said returned server data elements are to be copied by a network copy function and which said server data elements are to be copied automatically;

means for executing a memory management process, for said server data elements to be copied automatically, from the returned high level data structure to another high level, data structure including means for determining whether any first level data elements are pointers, means for automatically copying each first level data element that is not a pointer to the client application, means for automatically copying all data elements defined by first level pointers, and means for zeroing the copied pointers to stop the network from chasing said pointers; and means for suspending said means for executing, for said returned server data elements to be copied by said network copy function, including means for invoking said copy function.

17. A memory management system for a client-server computing network, including a client-side function comprising:

means for passing one or more server return arguments to be copied into a client application;

means for automatically copying from the returned high level data structure to another high level data structure each said argument that is not a pointer, and for automatically copying each data element and data structure defined by an argument that is a pointer; and means for automatically zeroing all copied pointers to prevent the network from chasing said pointers and freeing data elements and data structures not copied.

18. The system of claim 17 further including:

means for recognizing a network resident copy function for one or more said arguments; and means to suspend said client-side function for all arguments designated for copying by said network resident copy function.

* * * * *